(12) United States Patent
Clüsserath

(10) Patent No.: US 10,696,433 B2
(45) Date of Patent: Jun. 30, 2020

(54) METHOD AND DEVICE FOR PRODUCING AND FILLING CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 888 days.

(21) Appl. No.: 14/769,900

(22) PCT Filed: Jan. 15, 2014

(86) PCT No.: PCT/EP2014/000088
§ 371 (c)(1),
(2) Date: Aug. 24, 2015

(87) PCT Pub. No.: WO2014/127876
PCT Pub. Date: Aug. 28, 2014

(65) Prior Publication Data
US 2016/0023785 A1     Jan. 28, 2016

(30) Foreign Application Priority Data
Feb. 22, 2013   (DE) .......................... 10 2013 101 775

(51) Int. Cl.
*B65B 3/02*      (2006.01)
*B65B 31/02*     (2006.01)
(Continued)

(52) U.S. Cl.
CPC .......... *B65B 3/022* (2013.01); *B29C 49/4268* (2013.01); *B29C 49/78* (2013.01);
(Continued)

(58) Field of Classification Search
CPC ..................................................... B65B 3/022
See application file for complete search history.

(56) References Cited

U.S. PATENT DOCUMENTS 3,913,802 A     10/1975   Diianni

FOREIGN PATENT DOCUMENTS

| CH | 388 173 | 2/1965 |
| DE | 14 61 849 | 5/1969 |

(Continued)

OTHER PUBLICATIONS

English translation of DE 102006027477.*

*Primary Examiner* — Larry W Thrower
(74) *Attorney, Agent, or Firm* — Occhiuti & Rohlicek LLP

(57) ABSTRACT

An apparatus for transforming a pre-form into a container filled with liquid filling-material includes a feed line, a high-pressure source, a removal line, and a molding station having a mold, a mold space, and a mold head that permits liquid filling-material to be introduced into the pre-form under a filling pressure sufficient to transform the pre-form into a container and to seal against an opening of the pre-form as liquid filling-material flows through the feed line. The high-pressure source is in fluid communication with the liquid filling-material in the container such that exposure of the liquid filling-material to gas pressure in excess of the filling pressure pushes a pre-determined volume of the liquid filling-material out of the container, thereby forming a headspace in the container.

20 Claims, 1 Drawing Sheet

(51) Int. Cl.
  *B65B 3/26*   (2006.01)
  *B29C 49/42*  (2006.01)
  *B29C 49/78*  (2006.01)
  *B65B 3/10*   (2006.01)
  *B65B 3/30*   (2006.01)
  *B29C 49/46*  (2006.01)
  *B29C 49/06*  (2006.01)
  *B29L 31/00*  (2006.01)
  *B29C 49/62*  (2006.01)
  *B29C 49/48*  (2006.01)

(52) U.S. Cl.
  CPC .................. *B65B 3/10* (2013.01); *B65B 3/26* (2013.01); *B65B 3/30* (2013.01); *B65B 31/025* (2013.01); *B29C 49/06* (2013.01); *B29C 2049/465* (2013.01); *B29C 2049/4664* (2013.01); *B29C 2049/4679* (2013.01); *B29C 2049/4887* (2013.01); *B29C 2049/627* (2013.01); *B29C 2791/006* (2013.01); *B29C 2791/007* (2013.01); *B29L 2031/712* (2013.01); *B29L 2031/7158* (2013.01)

(56) References Cited

FOREIGN PATENT DOCUMENTS

| | | |
|---|---|---|
| DE | 18 00 525 | 5/1970 |
| DE | 23 52 926 | 4/1975 |
| DE | 42 12 583 | 10/1993 |
| DE | 43 40 291 | 6/1995 |
| DE | 102006027477 | * 12/2006 |
| DE | 10 2006 045987 | 4/2008 |
| DE | 10 2011 011 076 | 8/2012 |
| DE | 10 2011 009889 | 8/2012 |
| EP | 2 463 079 | 6/2012 |
| GB | 1 017 122 | 1/1966 |
| GB | 1017122 | * 1/1966 |
| JP | H10157799 | 6/1998 |
| JP | 2002512156 | 4/2002 |
| JP | 2010504886 | 2/2010 |
| JP | 2013132861 | 7/2013 |
| WO | WO2012/054221 | 4/2012 |
| WO | WO2012/076576 | 6/2013 |

* cited by examiner

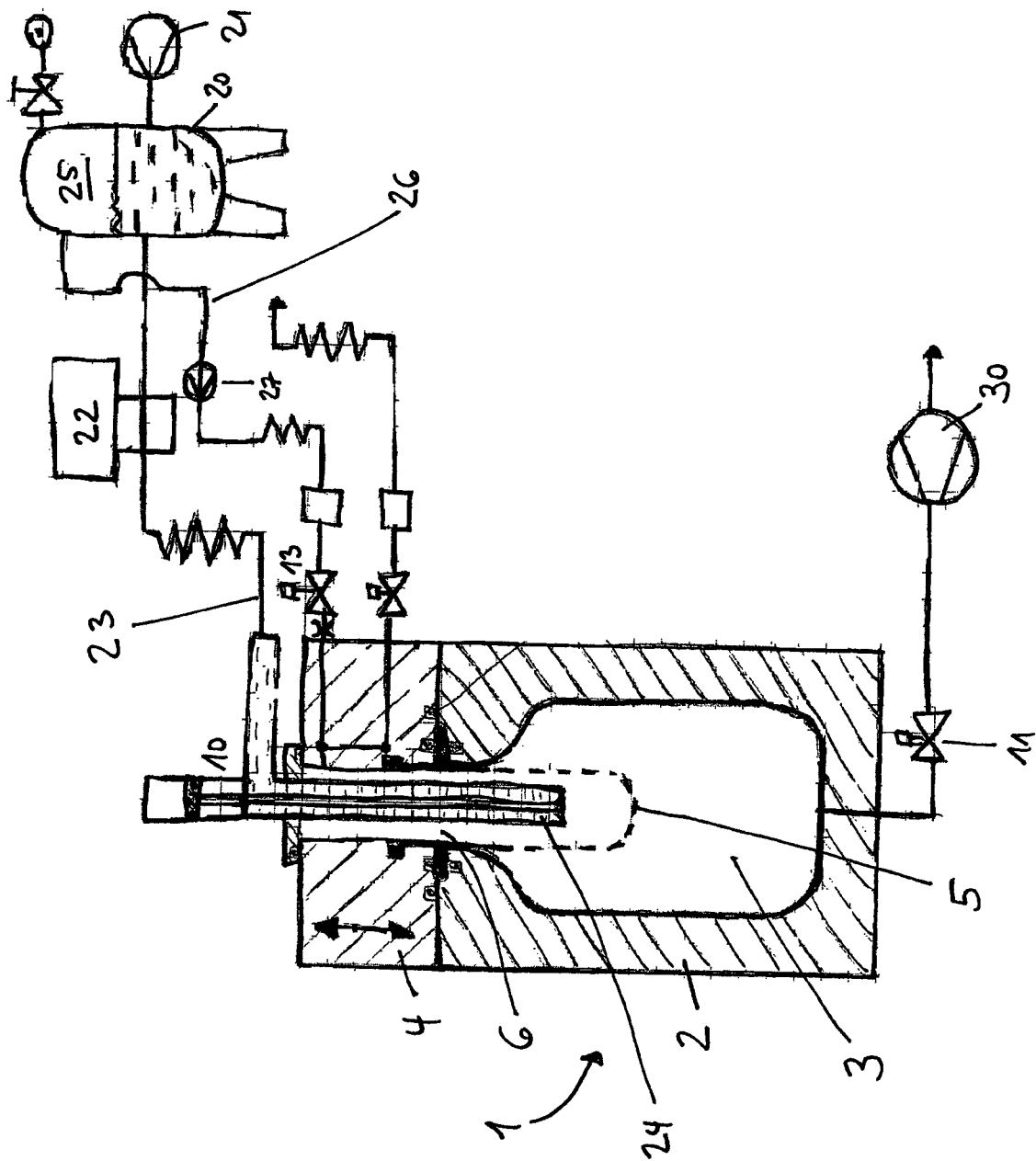

METHOD AND DEVICE FOR PRODUCING AND FILLING CONTAINERS

RELATED APPLICATIONS

This is the national stage under 35 USC 371 of PCT/EP2014/000088, filed of Jan. 15, 2014, which claims the benefit of the Feb. 22, 2013 priority date of German application 102013101775.4, the contents of which are herein incorporated by reference.

FIELD OF INVENTION

The present invention relates to a method for producing containers from preforms and a device therefor.

BACKGROUND

It is known to blow mold a container by blowing gas into a preform. The resulting container can then be filled. This, however, is a two-step operation.

It is also known to transform a preform into a container by filling it with liquid filling-material that is under sufficient hydraulic pressure. Essentially, the liquid filling material plays the role of the gas that would normally be blown into the preform.

When the foregoing procedure is used, the container must be completely filled in order to be entirely molded. As a result, it is necessary to remove some of the liquid filling-material to create a headspace before closing the container.

In certain cases, a stretching bar supports the preform as it expands into a container. If this stretch bar is removed from the container after filling, the volume displaced by the stretching bar becomes the volume of the headspace.

SUMMARY

The invention is directed to the case in which the pre-form is not supported by a stretching bar. In such cases, another way must be found to create the headspace.

In one aspect, the invention features a method for manufacturing a container that contains liquid filling-material. Such a method includes producing a container from a preform by executing a form-and-fill phase that transforms the preform into a filled container by filling the preform with liquid filling-material that is maintained at a filling pressure. At this point, the container will be too full. As a result, one must create a headspace. Creating a headspace includes pushing a predetermined volume of the liquid filling-material out of the container by exerting gas pressure that is in excess of the filling pressure on the liquid filling-material through a removal line that is present in the container.

In some practices, exerting pressure includes exerting gas pressure. Among these are practices are those in which doing so includes using an inert gas as a medium for transmitting the pressure.

In other practices, filling the preform includes using a flow meter to measure volume of liquid filling-material that is entering the preform, and pushing the predetermined volume out of the container includes using the same flow meter to measure a volume of liquid filling-material that has been pushed out of the container.

In other practices, filling the preform includes passing liquid filling-material into the preform through a first line. In such practices, pushing the pre-determined volume of liquid filling-material out of the container includes pushing the pre-determined volume of liquid filling-material out through the first line.

Also among the practices of the invention are those in which creating the headspace includes passing the liquid filling-material through an opening in the removal line, a location of which controls an extent of the headspace. In such practices, the higher the opening is, the smaller the headspace will be.

Other practices include determining when a level of liquid filling-material that is in the container has reached a predetermined level. This can be carried out by using an electric probe to determine when a level of liquid filling-material that is in the container has reached a predetermined level.

In some practices, exerting pressure on the liquid filling-material to create the headspace is preceded by at least partially balancing the liquid filling-material from the filling pressure.

In another aspect, the invention features an apparatus for transforming a pre-form into a container filled with liquid filling-material. Such an apparatus includes a feed line, a high-pressure source, a removal line, and a molding station. The molding station includes a mold, a mold space, and a mold head. The mold head is configured to permit liquid filling-material to be introduced into the pre-form under a filling pressure sufficient to transform the pre-form into a container. The mold head seals against an opening of the pre-form as said high-pressure source pushes the liquid filling-material through the feed line at a filling pressure. When exposed to gas pressure in excess of the filling pressure, the pressure differential drives or pushes a pre-determined volume of the liquid filling-material out of the container. This forms a headspace in the container.

In some embodiments, the high-pressure source includes an inert-gas storage element filled with inert gas.

Other embodiments include a flow meter through which the removal line flows.

Yet other embodiments include a storage element that stores the liquid filling-material. In these embodiments, the removal line connects to the storage element.

In other embodiments the same line is used as a delivery line and as a removal line.

Yet other embodiments include those in which the removal line includes an opening that is located on the removal line at a point that corresponds to a liquid filling-material level after creation of the headspace.

In other embodiments, the high-pressure source is connected to a plurality of mold heads, all of which derive pressure for forming the headspace from the high-pressure source.

Also among the embodiments are those in which the high-pressure source includes a ring boiler or a ring pipe.

Yet other embodiments have an electric probe for measuring whether a desired fill level has been reached in the container.

In another aspect, the invention features an apparatus for transforming a pre-form into a container filled with liquid filling-material. Such an apparatus includes a feed line, a high-pressure source, a removal line, and a molding station. The molding station has a mold, a mold space, and a mold head that permits liquid filling-material to be introduced into the pre-form under a filling pressure sufficient to transform the pre-form into a container. The mold head seals against an opening of the pre-form as liquid filling-material flows through the feed line. The high-pressure source is in fluid communication with the liquid filling-material in the container such that exposure of the liquid filling-material to gas pressure in excess of the filling pressure pushes a predetermined volume of the liquid filling-material out of the container, thereby forming a headspace in the container.

Another aspect features a method for producing containers filled with liquid filling-material from preforms. The preform is formed in a form-and-fill phase. The container that is formed is almost completely filled with the liquid filling-material. For the creation of the headspace, a specified volume of the liquid filling-material is removed from the container by the action of pressure on the liquid filling-material using a removal line that is introduced into the container.

In one aspect, the invention features an apparatus for transforming a preform into a container that contains liquid filing-material. The apparatus has at least one molding station, having at least one mold that forms a molding space and at least one mold head. Turning the preform into a container involves carrying out blow molding but using the liquid filling-material as the pressure medium. One places the preform's opening in sealed position against the mold head and introduces a liquid filling-material through the delivery line. The liquid filling-material also functions as a pressure medium. The apparatus further includes a removal line for the removal of a specified volume of the liquid filling-material that is present in the container after the blow-molding. One end of the removal line is located in the interior of the newly formed container. The apparatus further includes a source of high pressure for exposing the liquid filling-material to gas pressure.

With the method according to the invention, a container is formed and filled in one working cycle from a preform. The container at this point has been filled to the brim or close to the brim. As a result, it must be emptied of a predetermined volume before begin closed. Doing to creates a headspace beneath the closure point.

According to the invention, removal of the specified volume for the creation of the headspace includes exerting pressure on the liquid filling-material. The volume of liquid filling-material volume that is to be removed can then be removed from the container via the removal line. Due to the pressure differential, the filling contents are pressed out, pushed out, or otherwise driven out of the container through the line, one end of which is located inside the newly-formed container that was once a preform.

Preferably, the pressure effect is achieved by gas pressure. For this purpose, an inert gas or gas mixture is used. Examples of a suitable inert gas include carbon dioxide and nitrogen.

In order to remove a defined volume of the liquid filling-material from the newly formed container, it is often useful to be able to measure volume of the removed liquid filling-material as it is being removed. For this purpose, some embodiments include a magnetic inductive flow meter that provides data from which such volumes can be determined by integration over time. Preferably, one and the same flow meter measures both the volume of liquid filling-material that flows into the container as well as the volume of liquid filling-material that is being pushed out of the container to form the headspace. A magnetic inductive flow meter is particularly well suited for this purpose.

Advantageously, the removal of the liquid filling-material can take place via the delivery line. The delivery of the liquid filling-material for the forming and filling of the container from the preform usually takes place via a delivery line that ends in the interior of the original preform.

The pressure effect on the liquid filling-material outside the delivery line forms an overpressure. This overpressure pushes liquid filling-material back into the delivery line, thus removing it from the newly formed container. A particular advantage of this embodiment is that the liquid filling-material removed from the container is conducted back into a storage tank from whence originally came. Therefore, it can be used again to fill another preform.

In some embodiments, a defined headspace is produced by arranging the removal line in the container in such a way that the highest point of its opening corresponds to the intended liquid filling-material level in the container after the formation of the headspace. An opening can be the highest opening of the liquid filling-material delivery line with which the preform and the container being formed are filled through a plurality of openings. An opening can also be the lower end of a removal line that is introduced into the container as far as the desired liquid filling-material level after the headspace formation.

In this way, the pressure on the liquid filling-material pushes liquid filling-material through the removal line until the liquid filling-material level in the container reaches the upper edge of the opening of the removal line. Once this condition is reached, no further liquid filling-material can leave the container. Instead, only compressed gas flows through the removal line.

Preferably, gas pressure is applied for just long enough to push the necessary volume of liquid filling-material through the removal line. This restricts gas consumption. This can be achieved by providing an instrument coupled to the removal line for determining whether what flows through the removal line is liquid, in which case the gas pressure continues to be applied, or gas, in which case the gas pressure is disconnected.

As an alternative, it is also possible to measure how much liquid filling-material has been pushed out of the container. This can be done using a flow meter. The flow meter sends a signal to a controller, which then determines how much liquid filling-material has been pushed out and, when enough has been pushed out, sends a corresponding control signal to a gas source or gas delivery device to regulate or control the gas consumption. In some cases, the gas source is immediately shut down when the required headspace has been created. However, in other cases, additional gas can be pumped through even after the headspace is created so as to suppress post-dripping or emptying of the removal line during a final pressure relief phase.

In those embodiments that rely on a flow meter, it is useful to take steps to avoid corrupting the flow meter measurement as a result of gas present in the line. Accordingly, in an improved version of the method described herein, before or during the filling-and-forming procedure, the removal line is filled with liquid filling-material. This ensures that there will be no gas present in that line during measurement of the volume of liquid filling-material that is pushed out of the newly formed container.

It is also possible for the liquid filling-material level in the container to be measured, for example by an electric probe. Such a probe can advantageously be integrated into the mold itself. In particular, it is possible to measure whether a predetermined level has been reached. As soon as this level has been reached, the process of headspace creation can be terminated.

For the creation of the headspace, an overpressure must be exerted on the liquid filling-material in order to force the liquid filling-material out of the container. Inasmuch as the mold pressure of, for example, up to 16 bar is maintained, the pressure exerted on the liquid filling-material must be correspondingly higher. This creates a new problem. As a result of this high pressure, gas intended for pushing the liquid filling-material out can instead find itself dissolved in the liquid filling-material.

Accordingly, it is sometimes advantageous to at least partially pressure balance the liquid filling-material after the forming and filling the container and before creating the headspace. In particular, the liquid filling-material is at least partially pressure-balanced, e.g. to 4 to 10 bar, and preferably to a pressure range that remains below 7 bar, such as a pressure range from 4 to 7 bar. The value chosen depends on, for example, the filling temperature and the desired dissolved gas concentration in the liquid filling-material. This partial pressure balancing procedure results in less gas being dissolved in the liquid filling-material. As a result, the process of liquid filling-material expulsion to create the headspace can take place more economically.

The source of pressure for expelling liquid filling-material preferably includes an inert gas storage element containing a compressed inert gas, examples of which are carbon dioxide and nitrogen. As a result, the compressed inert gas cannot have a negative influence on the useful life of the liquid filling-material. If the liquid filling-material is to be carbonated anyway, carbon dioxide is a particularly good choice for an inert gas since its choice ensures that no foreign gases will be dissolved in the liquid filling-material even under the effect of pressure.

In some embodiments, the removal line can advantageously be provided with a flow meter, in particular a magnetic inductive flow meter. This permits a volume of liquid filling-material pushed out of the container to be measured so that one can more precisely achieve removal of a specified volume.

In some embodiments, the second end of the removal line ends in a liquid filling-material storage container. As a result, the liquid filling-material removed from the container during creation of the headspace can be collected and used again.

In some embodiments, the delivery line is used as the removal line. In this way the liquid filling-material conducted out of the formed container can be conducted directly back into the liquid filling-material container and re-used in subsequent forming and filling procedures.

In some embodiments, the removal line comprises an opening, the level of which corresponds to the liquid filling-material level in the container after the creation of the headspace. Among these embodiments are those in which the liquid filling-material is delivered through plural apertures. In these embodiments, the highest such aperture is the opening. However, in other embodiments, a removal line is inserted into the container as far as the desired liquid filling-material level after the creation of the headspace. In these embodiments, the opening is at the lower end of that removal line.

In some embodiments, an electric probe measures the liquid filling-material level in the container to determine whether a predetermined level has been reached. Among these embodiments are those in which the electric probe is integrated into the mold. Using such a probe, it is possible to determined that the desired liquid filling-material level has been reached in the container and that a headspace of the correct volume has been created. The procedure can then be ended and the container closed.

The forming and filling procedure described herein has been described on the basis of an individual molding station. In practices, the procedure is carried out on machines that form and fill a plurality of containers more or less at the same time. On such machines, it is advantageous if the molding heads in at least one group of molding heads are in connected together by lines to a common source of gas pressure. A suitable source of such gas pressure can include one or more ring boilers or ring pipes.

BRIEF DESCRIPTION OF THE DRAWING

The invention is explained in greater detail hereinafter on the basis of the appended FIG. 1, which shows a schematic representation of a system for transforming a preform into a container that contains liquid filling-material.

DETAILED DESCRIPTION

FIG. 1 shows a forming-and-filling station 1 that has at least one mold 2 forming a mold chamber 3. A mold head 4 closes off the top of the mold 2. A preform 5, represented in the FIGURE by a broken line, can be introduced into the mold. When properly seated, the preform's opening 6 is sealed against the mold head 4.

A first line 23 connects the mold head 4 to a storage element 20 that stores liquid filling-material under an inert gas 25. An example of a suitable inert gas 25 is carbon dioxide.

A first high-pressure pump 21 maintains the liquid filling-material under a filling pressure. A first valve 10 in the first line 23 permits liquid filling-material in the storage element 30 to enter the pre-form 5.

The first line 23 extends from the storage element 20 into a filling-material delivery-element 24 that opens into the interior of the preform 5. In operation, a flow meter 22 in the first line 23 measures how much liquid filling-material has passed through the delivery line. In some embodiments, the flow meter 22 is a magnetic inductive flow meter.

To produce a filled container, a preform 5 is first thermally conditioned by passing it through a heating section. Next, the preform 5 is introduced into the open mold 2. The mold head 4 is then closed such that the opening 6 of the preform 5 comes in sealing contact with the mold head 4.

The preform 5 can then be prepared in a suitable manner for subsequent forming and filling. Typical steps include sterilizing the preform 5, flushing the preform 5 with inert gas, and evacuating the preform 5.

The next step is to start the form-and-fill phase. This begins with opening the first valve 10 to introduce, into the preform 5, liquid filling-material from the storage element 20 under a high filling pressure produced by the first high-pressure pump 21. The inflowing filling material transforms the preform 5 into a container as it fills it. To support the transformation of the preform 5, it is useful to reduce the pressure in the mold chamber 3. This is carried out by opening a second valve 11 to connect the mold chamber 3 to a vacuum pump 30.

At the end of the filling process, the formed container is filled to the brim. Before closing, a headspace must be produced by removing a volume of the filling material.

For this purpose, a second line 26 connects the inert gas 25 in the storage element 20 to the mold head 4. A third valve 13 in the second line 26 controls communication between the storage element 20 and the mouth 6 of the newly-formed container Arranged in the second line 26 is a second high-pressure pump 27. The second high-pressure pump 27 produces a higher pressure than the filling pressure. Opening the third valve 13, thus exposes the liquid filling-material in the container to pressure that is higher than the filling pressure. The resulting pressure differential pushes liquid filling-material that is already in the container back through the first line 23 and back into the storage element 20.

As the liquid filling-material is pushed back along the first line 23, the flow meter 22 measures how much has gone by. When the flow meter 22 detects that enough has gone by to create the required headspace, the first and third valves 10 13 are closed. The container can be pressure-balanced and closed.

It is advantageous that the same flow meter 22 be used to measure both the filling material flowing toward the preform 5 and the filling material that comes back from the container. As a result, there is no need to calibrate one flow meter against another.

A similar method for creating a headspace includes placing an opening at the filling-material delivery-element 24, or at another line that is suitable for the removal of filling material. The upper edge of such an opening corresponds to the desired filling material height in the container after the creation of the headspace. As long as the opening is located completely inside the filling material, exposure to the high-pressure will push filling material out of the container through the first line 23. If the level of filling material falls below the upper edge of the opening, no further filling material will be pushed back into the first line 23. Instead, only compressed gas will be pushed back. When the desired filling level is reached, the container can be pressure-balanced and closed.

A system as described herein can have a plurality of forming and filling stations 1 that can form and fill a corresponding plurality of containers at the same time or at different times.

Having described the invention, and a preferred embodiment thereof, what is claimed as new, and secured by Letters Patent is:

1. A method for manufacturing a container that contains liquid filling-material, said method comprising producing a container from a preform, wherein producing said container comprises
executing a form-and-fill phase, wherein executing said form-and-fill phase comprises causing said preform to transform into a filled container, wherein causing said preform to transform into a filled container comprises filling said preform with liquid filling-material that is maintained at a filling pressure, and pushing a predetermined volume of said liquid filling-material out of said container, and wherein pushing said predetermined volume out of said container comprises exerting gas pressure that is in excess of said filling pressure on said liquid filling-material through a first line, wherein said first line connects a pressure source that exerts a gas pressure in excess of said filling pressure and opens into said container.

2. The method of claim 1, wherein exerting pressure comprises using an inert gas as a medium for transmitting said pressure.

3. The method of claim 1, wherein filling said preform comprises using a flow meter to measure volume of liquid filling-material that is entering said preform and wherein pushing said predetermined volume out of said container comprises using said flow meter to measure a volume of liquid filling-material that has been pushed out of said container.

4. The method of claim 1, wherein filling said preform comprises passing liquid filling-material into said preform through a second line and wherein pushing said pre-determined volume of liquid filling-material out of said container comprises pushing said pre-determined volume of liquid filling-material out through said second line.

5. The method of claim 1, wherein pushing a predetermined volume of said liquid filling-material out of said container comprises passing said liquid filling-material through an opening in said first line and wherein a location of said opening controls an extent of a headspace.

6. The method of claim 1, further comprising determining when a level of liquid filling-material that is in said container has reached a predetermined level.

7. The method of claim 1, further comprising using an electric probe to determine when a level of liquid filling-material that is in said container has reached a predetermined level.

8. The method of claim 1, further comprising, before exerting pressure on said liquid filling-material, at least partially balancing said liquid filling-material from said filling pressure.

9. The method of claim 1, further comprising, after having filled said preform, pressure balancing said liquid filling-material with gas at a pressure of between four and ten bar and, after having pressure balanced said liquid content, introducing gas into said container to push said predetermined volume out of said container, thereby creating a headspace, and introducing gas into said headspace from time to time.

10. The method of claim 9, wherein introducing said gas comprises introducing nitrogen gas.

11. The method of claim 9, wherein introducing said gas comprises introducing carbon-dioxide gas.

12. The method of claim 9, further comprising using a magnetically-inductive flow meter to measure a volume of liquid filling-material that flows into said preform and a volume that is forced out of said container during creation of said headspace.

13. The method of claim 9, wherein filling said preform with said liquid filling-material comprises passing said liquid filling-material into said preform through a delivery line, said method further comprising creating said headspace by forcing liquid filling-material out of said container through said delivery line.

14. The method of claim 9, wherein filling said preform with said liquid filling-material comprises passing said liquid filling-material into said preform through a delivery line that has an opening, wherein a highest point of said opening corresponds to a filling-product level in said container following formation of said headspace, said method further comprising forcing liquid filling-material out of said container through said opening and forcing said gas out of said container through said opening.

15. The method of claim 9, further comprising, using an electrical probe, measuring a filling-product level in said container and determining, based at least in part on said measurement, that a predetermined filling-product level has been reached.

16. The method of claim 1, further comprising, upon detecting that fluid being driven out of through said first line is no longer liquid but gaseous, disconnecting said first line from said pressure source.

17. The method of claim 1, further comprising pre-filling a second line with said liquid filling-material and, after having filled said second line, allowing said gas pressure to force said liquid filling-material in said container out of said container through said second line.

18. The method of claim 1, wherein filling said preform with liquid filling-material that is maintained at a filling pressure comprises causing said liquid filling-material to enter said preform through a second line, said method further comprising expelling said liquid filling-material out of said container through said second line.

19. The method of claim 1, further comprising placing said preform into a mold head and connecting said pressure source that exerts a gas pressure in excess of said filling pressure to said mold head, wherein said pressure source is connected to other mold heads.

20. The method of claim 1, further comprising selecting said pressure source that exerts said gas pressure in excess of said filling pressure from the group consisting of a ring boiler and a ring pipe.

\* \* \* \* \*